United States Patent [19]

Hawkins

[11] Patent Number: 4,483,128
[45] Date of Patent: Nov. 20, 1984

[54] VARIABLE DRIVE FOR A HARVESTER FUNCTIONAL ELEMENT

[75] Inventor: Robert W. Hawkins, Rapids City, Ill.

[73] Assignee: Deere & Company, Moline, Ill.

[21] Appl. No.: 395,767

[22] Filed: Jul. 6, 1982

[51] Int. Cl.³ ............................................. A01F 12/00
[52] U.S. Cl. ...................................... 56/11.1; 56/11.4; 74/781 R
[58] Field of Search ...................... 56/11.1, 11.2, 11.4; 74/689, 740, 781 R, 784, 802; 192/4 R

[56] References Cited

U.S. PATENT DOCUMENTS

| | | | |
|---|---|---|---|
| 3,175,425 | 3/1965 | Horne et al. | 74/745 |
| 3,375,738 | 4/1968 | Love | 74/740 |
| 3,430,505 | 3/1969 | Oliva et al. | 74/230.17 |
| 3,543,767 | 12/1970 | Witzel | 130/27 |
| 4,138,837 | 2/1979 | Love | 56/11.2 |

FOREIGN PATENT DOCUMENTS 2354440 2/1981 Fed. Rep. of Germany ....... 56/11.2

Primary Examiner—Robert P. Swiatek
Assistant Examiner—David I. Tarnoff

[57] ABSTRACT

In a drive system for the threshing cylinder of a combine harvester, a conventional infinitely variable V-belt drive, is combined with a two-speed final drive assembly. In the final drive assembly, an epicyclic gear train is housed within the body of a driven sheave journaled on the cylinder shaft. For a direct drive mode, the sheave is coupled to the shaft by way of a flange mounted non-rotatably on the shaft. A sun gear of the gear train is controllable externally of the sheave body and may be non-rotatably secured relative to the combine body for a cylinder speed reducing mode. The combine cylinder speed is therefore infinitely variable within, selectively, either an upper range or a lower range.

22 Claims, 7 Drawing Figures

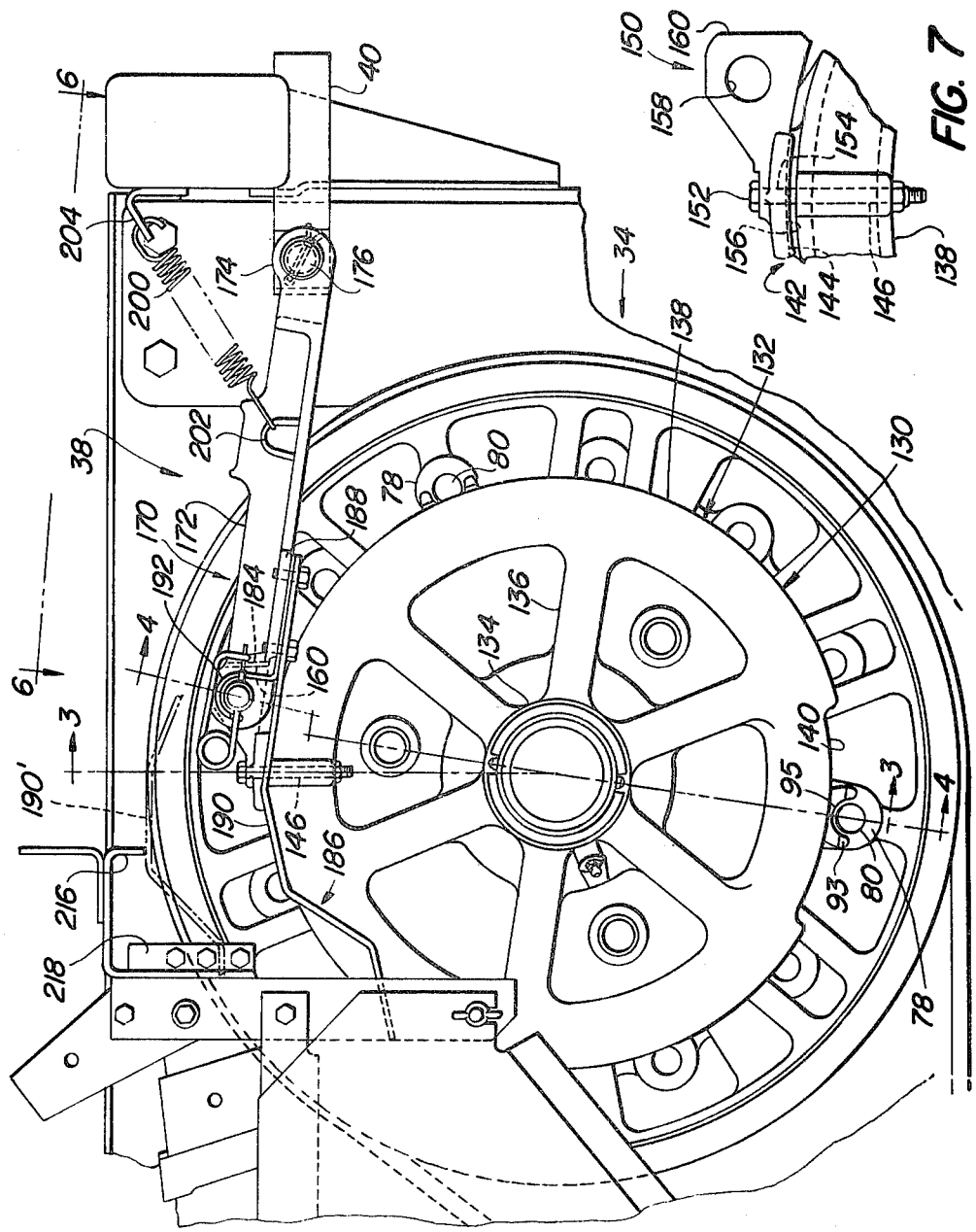

VARIABLE DRIVE FOR A HARVESTER FUNCTIONAL ELEMENT

BACKGROUND OF THE INVENTION

This invention concerns drives for agricultural machine elements and more particularly a variable speed drive especially useful for driving a harvesting machine element such as the threshing cylinder of a combine.

Variable speed drives for harvesting machine elements make it possible to adjust element speed to optimize performance in a particular operating condition or crop type. Thus, drive systems for combine harvester threshing cylinders commonly include a variable speed component such as an infinitely variable V-belt drive. Such drives, however, have an inherently limited speed range.

The speed range available is sometimes extended by including a changeable gear drive in the drive system so that the infinitely variable speed feature is available in two or more ranges. U.S. Pat. No. 3,375,738 Love, also assigned to the assignee of the present invention, discloses a drive of this general type. However, the geared portions of known drive systems were generally somewhat complex and bulky, particularly in terms of axial extent. Typically, even in co-axial gear-driven sheave arrangements, the driven sheave was axially and structurally separated from the final drive gear assembly. Manufacturing cost of such drives was relatively high and their bulk limited their adaptability.

The arrangement disclosed in co-pending patent application Ser. No. 299,277 filed Sept. 4, 1981 in the names of Love et al and also assigned to the assignee of the present invention, overcomes the above-mentioned problems. However, the embodiment there disclosed may, in some applications, suffer some shortcomings both in the direct drive and speed-reducing modes. In the direct drive mode, power is transmitted through the "locked up" epicyclic gear train with possibility of fretting or uneven wear on the gear teeth. In the speed-reducing mode, with the drive protected by a shear bolt arrangement, it is possible in some circumstances for damaging contact to occur between the adjacent parts disconnected by the shear bolt failure.

SUMMARY OF THE INVENTION

Accordingly, it is an object of the present invention to provide, preferably in combination with a belt drive, a compact, simple, relatively low cost rotatable final drive transmission, co-axial with the shaft of a rotatable element of an agricultural machine and selectively operable in at least two modes to provide at least two driven speeds for the element relative to the input speed of the transmission. In keeping with the invention, the final drive transmission may be combined with or powered by a variable speed input directly to a driven surface of the final drive transmission. For example, the perimeter of the final drive transmission may include one or more V-belt grooves engaged by the V-belt or belts of a belt portion of the final drive to the machine element. When the sheaves of this portion of the drive are of fixed diameter, the driver may be driven at a speed infinitely variable within the range provided by a variable speed belt drive connected to a power source on the machine.

Preferably, the final drive transmission includes a reduced speed output mode so that, when it is belt driven, relatively high drive belt speeds may be maintained at relatively low driven element speeds so as to reduce belt loading and extend belt life.

It is a particular object of the present invention to provide a simple, low cost direct drive mode which bypasses internal components of the drive system such as gears in an epicyclic train, so as to avoid the problem of uneven wear on such gears.

Another particular object is to provide a torque limiting system which is reliable and repeatable in operation and which, in the event that torque transmitted exceeds a predetermined maximum and the device operates to limit said torque, post-release behavior of the torque limiting device is benign, without the possibility for damaging interference between moving parts.

In a preferred embodiment of the invention, a driven sheave or pulley carried co-axially on the shaft of a rotatable harvester machine element, includes a body at least partly housing and carrying a gear train for transmitting power from the drive input perimeter surface of the sheave to the driven shaft. V-belt grooves of the sheave perimeter may axially overlap the gear train so that the axial extent of the final drive arrangement is minimized. The body of the sheave may be modified to form a housing for enclosing the gear train. A member of the gear train may be selectively controllable by means external to the housing so as to provide a choice of output speeds and hence driven speeds for the machine element.

The gear train, carried and contained by the sheave body, may include an epicyclic gear set having a pair of sun gears in constant engagement with a compound planetary set carried by the sheave body. Drive input may thus be through the planetary set and output through a first sun gear coupled directly to the shaft. A second or input sun gear may selectively be held from rotation, so that drive is indirect and output speed depends on the gear train ratios; or the sheave body may be coupled directly to the shaft so that the shaft is driven directly at sheave rotational speed.

In a preferred embodiment, the indirect drive results in a reduced output speed and hence the possibility of higher torque loading of the driven element. In some applications, it may be desirable to provide a load or torque limiting device in the drive train to provide automatic disconnect and avoid overloading of driven members. For example, a disconnect element such as a shear bolt may be provided in the means for holding the second sun gear from rotation. This latter means may for example, be a control link tying the second sun gear to the frame of the harvester. In a preferred embodiment, the control link connection to the second sun gear is by means of a torque member (preferably circular) coaxial with the sun gear. The periphery of the torque member is generally smooth but is locally modified to provide a shear bolt pad having a radial shear bolt bore and a shearing surface approximately tangential to the torque member circular periphery. In normal speed-reducing operation, the torque member is held stationary by a shear bolt passing generally radially through the control link and into the torque element. In the event of overload and bolt shearing, the smooth periphery of the torque element allows it to rotate with no chance of damaging impact on the control link which, almost immediately, responding to a bias means, moves generally radially outwards away from the periphery of the torque element.

An advantage of a transmission according to the invention is its compactness, particularly in overall axial extent, making it more readily adaptable to existing machines where space may be limited. Another advantage is that a transmission according to the invention provides a self-contained unitary speed-changing assembly, independent of the remainder of the drive system. Thus it may be replaced by a simple drive element such as a sheave or pulley in installations where the speed-changing feature is not required.

BRIEF DESCRIPTION OF THE DRAWINGS

FIG. 2 is an enlarged partial view, similar to FIG. 1, showing in more detail the two-speed cylinder final drive transmission assembly and the associated control link assembly connected in the reduced-speed mode.

FIG. 7 is an enlarged partial side view showing the shear-bolted connection of the shear lug to the torque wheel.

DESCRIPTION OF THE PREFERRED EMBODIMENT

Figure 1:
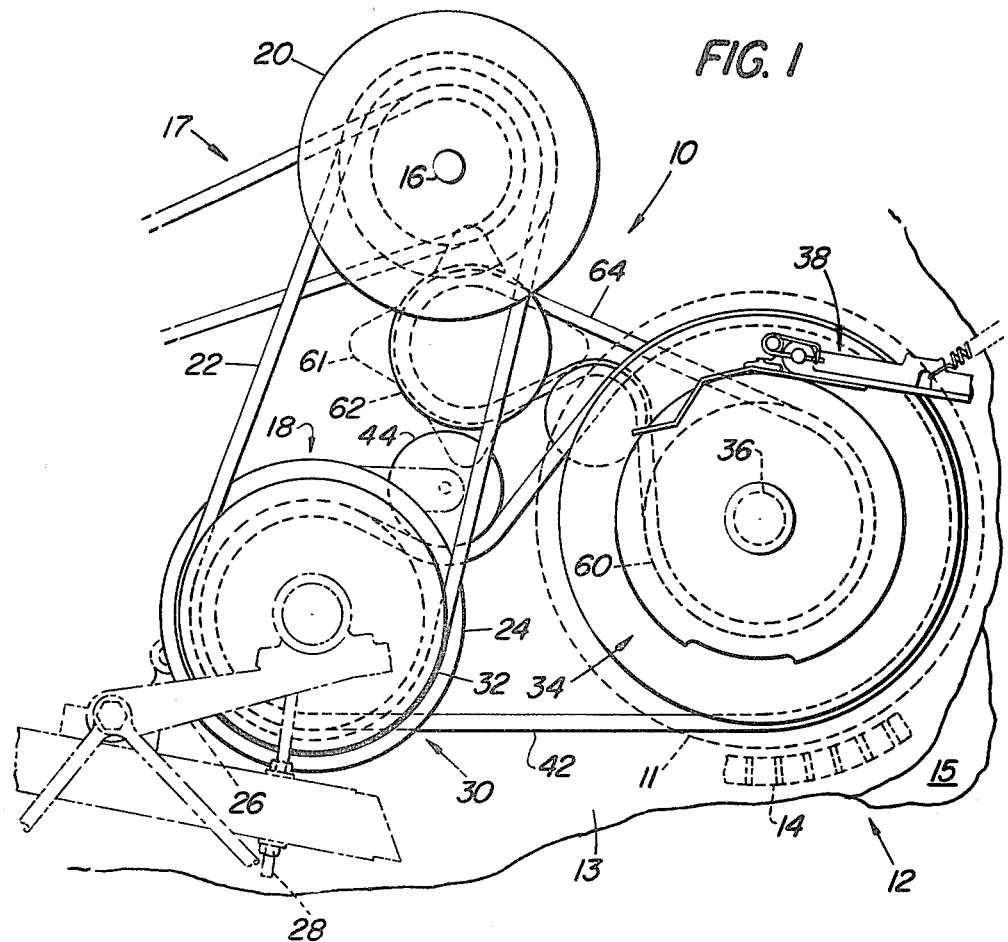
FIG. 1 is a semi-schematic partial right-hand side view of a forward portion of the separator body of a combine harvester showing the drive system for the combine threshing cylinder and including an embodiment of the invention. Some drive and structural elements have been omitted for clarity.

The invention is embodied in the drive system for the threshing cylinder of a conventional combine harvester shown only partially in FIG. 1. The drive system 10 and threshing cylinder 11 (indicated in hidden outline only) are carried at the forward end of the combine separator body 12 with the principal components of the drive system 10 adjacent to but outboard of the right-hand separator body wall 13. The threshing cylinder 11 and associated concave 14 extend between and are supported by the opposite right- and left-hand body walls, 13 and 15 respectively.

The drive system 10 includes a primary countershaft 16 receiving power from the combine engine (not shown) and transmitting it by variable speed V-belt drive 17 to an intermediate countershaft assembly 18. (Other V-belt drives powered by the primary countershaft 16 are omitted, as are some structural details, to simplify the drawing.) The variable speed drive 17 may be conventional with drive sheave 20 being hydraulically adjustable (not shown). In operation, the center distance of this drive is fixed but the intermediate countershaft assembly 18, including driven pulley 24 is carried on a pivoted cradle arrangement 26 which may be adjusted by means of draw bolt 28 to set center distance, to compensate for length variations in drive belt 22 while still maintaining the designed speed range.

The final drive to the threshing cylinder 11 is by a fixed speed-ratio multiple V-belt drive 30 comprising a drive sheave 32 included in the countershaft assembly 18 and directly driven from the pulley 24, and a transmission assembly 34 carried on the threshing cylinder shaft 36 and associated with a control link assembly 38, pivotally supported at its forward end by pivot bracket 40 carried by the combine body 12 (seen best in FIG. 2). A set of V-belts 42 trained around the sheave 32 and transmission assembly 34 transmits power between them. Belt tension in this fixed center drive is maintained by a conventional back-side idler 44 controlled by a conventional tensioning device (not shown). The cylinder shaft 36 is journaled in conventional bearings 48 carried by the separator body sidewalls 13, 15 (only the right-hand is shown—FIG. 3).

In the transmission assembly 34 (FIG. 3), torque input to the cylinder shaft 36 is by a splined drive hub 50 carried by the shaft immediately outboard of the bearing 48. The inboard end of the hub 50 has a radially extending flange 52 while the outboard end has an external spline 54 ending adjacent a shouldered bearing support portion 56 which carries a conventional single row ball bearing assembly 58. A beater drive sheave 60 mounted concentrically on the hub flange 52 drives a beater feeder 61 (indicated in hidden outline only, in FIG. 1) downstream of the threshing cylinder 11 through a driven sheave 62 and drive belt 64. The beater drive sheave 60 includes an annular flange 65 somewhat larger in diameter than the drive groove of the sheave and offset outwards and including a plurality of concentrically arranged holes 67.

Rotatably supported on the drive hub 50 by the bearing 58 is an inboard transmission assembly sheave portion 66, the body portion 68 of which includes a wall 70 having an outwardly offset outer portion 72 carrying a concentric rim 74 with V-belt grooves 76 for engaging the belts 42. Three equally circumferentially spaced control bosses 78 integral with the sheave wall outer portion 72 extend outward from the wall, each including an axially extending bore 80. The body 68 of the sheave portion 66 also includes a concentric annular wall 82 extending axially outboard from approximately the inner edge of the wall portion 72 and terminating in a machined surface 84 perpendicular to the rotational axis of the sheave portion 66 and helping to define a gear housing cavity 85. What may be considered as a sheave-portion subassembly is completed by the mounting on the splined portion 54 of hub 50 an internally and externally splined sleeve 86 carrying an external snap ring 88.

Figure 3:
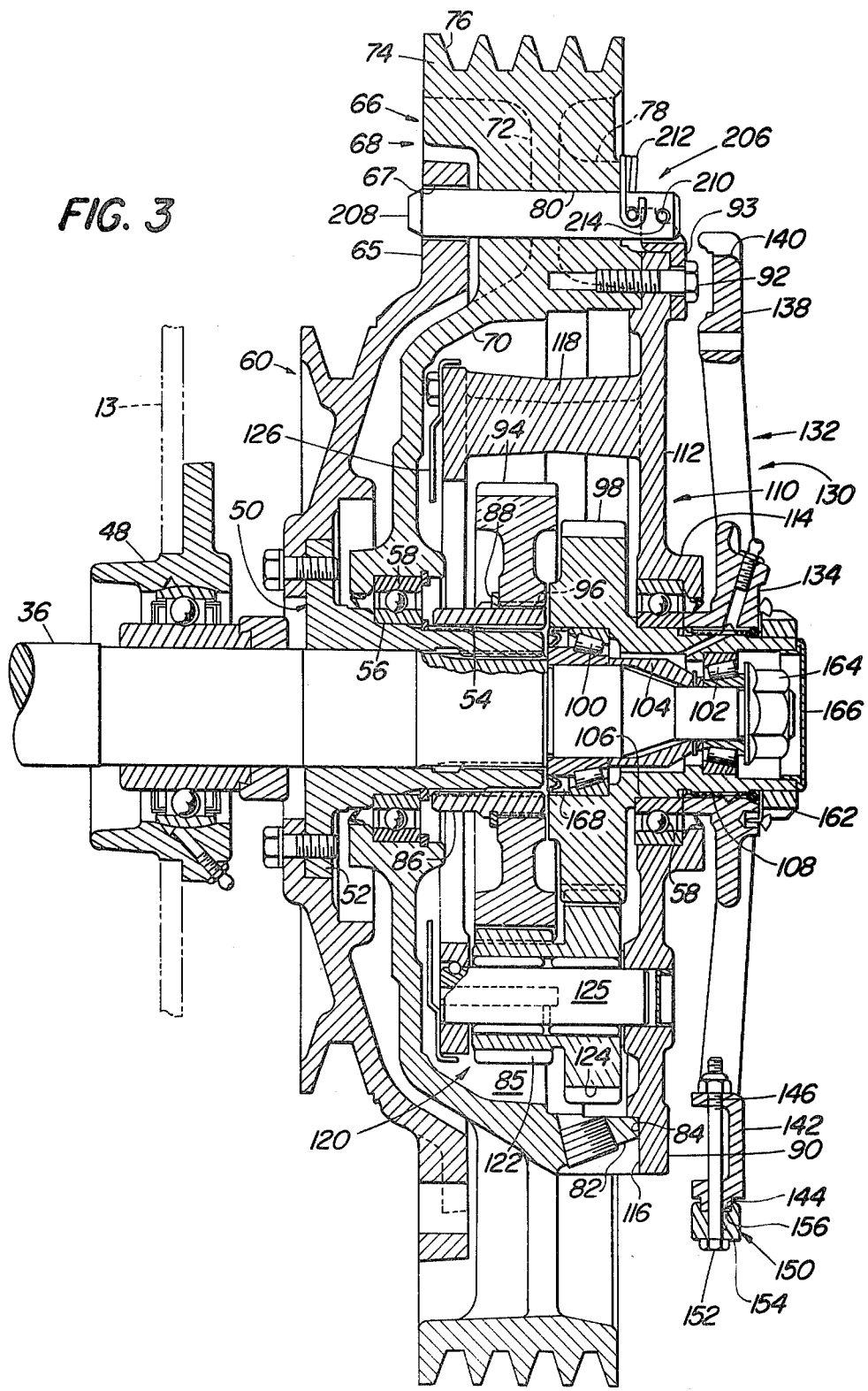
FIG. 3 is an enlarged cross-sectional partial view similar to a view taken approximately on line 3—3 of FIG. 2 but with the assembly rotated 180 degrees and the control pin assembly inserted for the direct drive mode. It shows the two-speed cylinder final drive transmission assembly and an outboard portion of the threshing cylinder shaft which it drives and on which it is supported.

The rotatable portion of the transmission assembly 34 is completed by a gear subassembly 90, secured to the sheave inboard portion 66 by a plurality of cap screws 92, a single example of which is shown in FIG. 3. As indicated by FIG. 3 (and confirmed by FIG. 2) there is a cap screw 92 in radial alignment with each of the three control bosses 78. Each of these cap screws 92 positions a pin retainer 93 so that an approximately semi-circular notch 95 in the pin retainer 93 registers with the bore 80 of the control boss 78.

In the gear subassembly 90, a first or output sun gear 94 is normally supported concentric with the shaft 36 by the mating of its internally splined bore 96 with the external spline of the sleeve 86 and maintained in axial alignment by the snap ring 88. A second or input sun gear 98 is journaled on the outboard end of the cylinder shaft 36 by inner and outer tapered roller bearings, 100 and 102 respectively. A spacer 104 facilitates control of bearing adjustment. An elongated outwardly extending hub portion of the second sun gear 98 includes a bearing support shoulder 106 adjacent the gear proper and an externally splined portion 108 towards its outer end. Another single row ball bearing 58 is carried by the shoulder portion 106.

Rotatably supported on the shaft 36 by the second bearing 58 is a sheave body outboard portion 110, comprising a generally radially extending wall 112, a central hub 114 housing the second bearing 58 and a peripheral machined annular face 116 for mating with the machined surface 84 of the annulus 82 of the sheave body inboard portion 68. To complete the epicyclic gear train, a generally concentric and annular planetary carrier portion 118 of the sheave portion 110 extends into the gear housing cavity 85 from the wall 112 and carries three equally spaced compound planetary pinions 120 (only one visible in FIG. 3). Each compound pinion includes first and second planet pinions 122, 124, mating respectively with the first and second sun gears 94 and 98 respectively and journaled on pins 125 retained in the planetary carrier portion 118. An annular planetary retaining ring 126, secured to the planetary carrier portion 118, completes the gear subassembly 90.

Immediately outboard of the sheave body portion hub 114 and carried concentrically and non-rotatably on the sun gear hub spline portion 108 is a torque member in the form of a torque wheel assembly 130. It comprises principally a relatively thin slightly dished spoked torque wheel 132 with a hub portion 134, spokes 136 and an annular rim 138. The rim is modified at two diametrically opposed points to form respectively, a relatively shallow notch 140 and a shear bolt boss 142. At the shear bolt boss the rim bulges slightly radially outwards to define a shear surface 144 approximately concentric with the wheel as a whole (seen best in FIG. 7). A shear bolt bore 146 extends radially through the rim in the approximate center of the shear surface 144.

In normal operation, a shear lug 150 is secured to the rim at the shear bolt boss 142 by a shear bolt and nut 152 passing through a shear bolt hole 154 in the lug and the bore 146 of the wheel 132. Functional features of the shear lug 150 include an arcuate shear surface 156 for mating with the shear surface 144 of the wheel 132, a retaining pin hole 158 perpendicular to the wheel rim and, associated with the retaining pin hole, a support edge 160.

The torque wheel assembly 130 is retained on the second sun gear hub spline 108 by a nut 162 while the complete gear subassembly 90 is retained on the shaft 36 by a smaller nut 164 with a conventional cap 166. The cap 166 and the conventional seal 168 at the opposite end seals the bearing grease cavity defined by the bore of the second sun gear 98.

Figure 6:
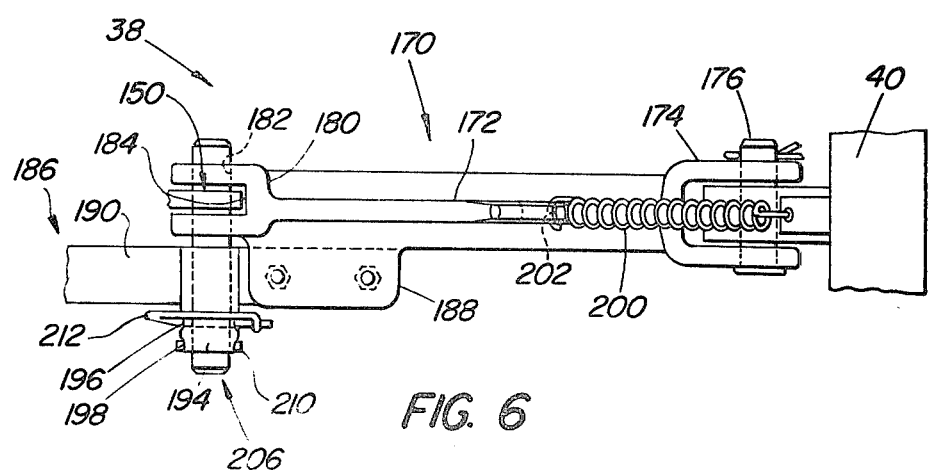
FIG. 6 is an enlarged partial view taken approximately on line 6—6 of FIG. 2 showing the pinned and shear-bolted connection of the control link to the torque wheel of the transmission assembly.

The control link assembly 38, best seen in FIGS. 2 and 6, includes an elongated control link 170 comprising an arm 172 of T-shaped cross section and opposite clevis ends. It is swingable in a vertical plane (perpendicular to the axis of cylinder shaft 36) pivoted on pivot bracket 40 by a fixed clevis end 174 retained by clevis pin 176. In the free end clevis 180, is a through bore 182 parallel to the fixed end pivot axis. At the root of the free end clevis 180 is an inclined machined surface 184.

Alongside and extending beyond the free end clevis 180 is a handle and pin retainer subassembly 186 secured by suitable hardware to a handle mounting pad 188 integral with the control link 170. The free end of the handle assembly 190 is offset somewhat downwards. Also, supported by the handle pad 188 is a pin retainer clip 192 the functioning portion of which is an inverted roughly semi-circular channel or socket 194 coaxial with and immediately alongside the connecting pin hole 182 of the control link 170. In the forward free edge of the socket portion 194 are two notches, an inner double sided notch 196 and an outer one sided notch 198. A tension spring 200 is connected between a spring slot or eyelet 202 in the control link 170 and a clip 204 rigidly attached to the combine body 12.

In harvesting operation, combine function is generally conventional with various adjustments of functional elements being made to suit crop and operating conditions. Among these are threshing cylinder rotational speed, selectively controllable by means of the variable speed drive 17 in either of two speed ranges as provided by the present embodiment of the invention. These ranges correspond to direct drive or coupling between the V-belt grooves 76 and the cylinder shaft 36 (FIG. 5) or indirect, through the speed-reducing gear train (FIG. 4).

The direct drive mode is selected by manually rotating the torque wheel assembly 130 until one of the bores 80 of the control pin boss 78 of the sheave assembly is aligned with one of the plurality of control pin holes 67 in the beater sheave flange 65, the aligned bores at the same time falling within the arc of the notch 140 of the torque wheel rim 138 (see FIG. 2). The transmission sheave portion 66 is then coupled to the beater sheave drive flange 65 by a control pin assembly 206. The pin assembly consists of a control pin 208 with a spring pin 210 in a cross-drilled hole at one end. The pin assembly 206 is retained by a hair pin cotter 212. It will be noted that the cross-drilled holes in the control pin 208 are timed together and that possible rotation of the pin is limited by engagement between the spring pin 210 and a shoulder 214 of the pin retainer 93 so that the hair pin cotter 212 is maintained in an alignment such as to avoid inadvertent retraction of the pin due to centrifugal force when in operation.

In the direct drive mode, the control link assembly 38 is retained in a retracted position with the handle portion 190 against a stop bracket 216 carried by the combine frame or body and clear of the rotating torque wheel assembly 130 (as indicated at 190' in phantom outline in FIG. 2) under the action of the tension spring 200. (In FIG. 5, the control link assembly 38 appears in a partially retracted position.) In this configuration, the sheave portion 66 is coupled to the beater sheave drive flange 65 which is carried non-rotatably by the shaft 36 so that drive is direct from the V-belt grooves 76 into the cylinder shaft 36, by-passing and hence imposing no load on the transmission gear train contained within the sheave assembly. Note that balance of the rotating transmission assembly is ensured in the direct drive mode by the dimensions of the notch 140 and location of control pin bore 80. The control pin assembly 206 can be inserted only at approximately 180 degrees from the shear bolt boss 142 and lug 150 so that their respective weights counter-balance each other as they rotate in fixed relationship.

Figure 4:
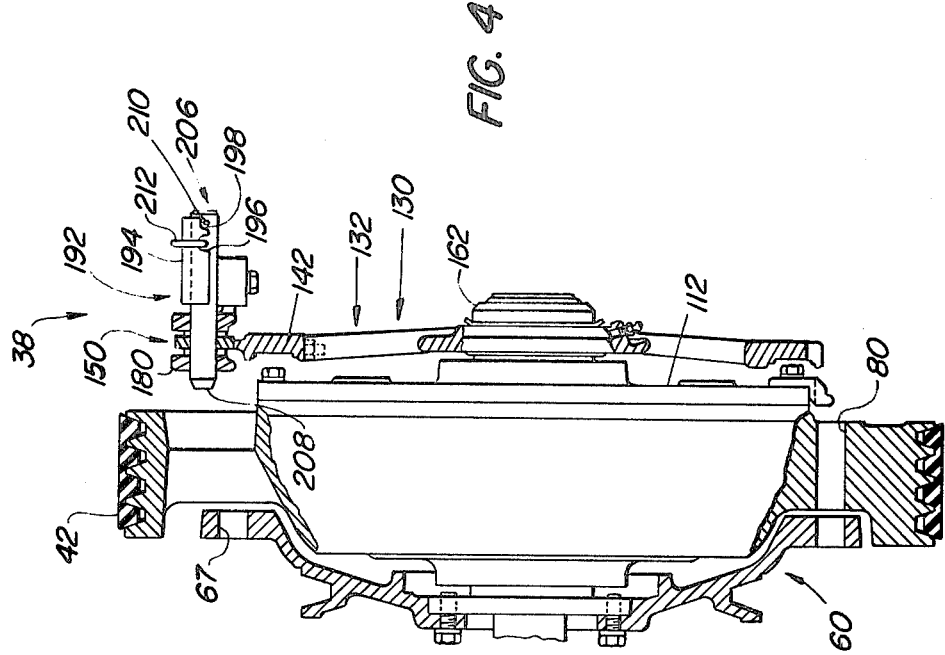
FIG. 4 is a partial cross-sectional view taken approximately on line 4—4 of FIG. 2. The control link is connected to the torque wheel for the reduced output speed mode.
Figure 5:
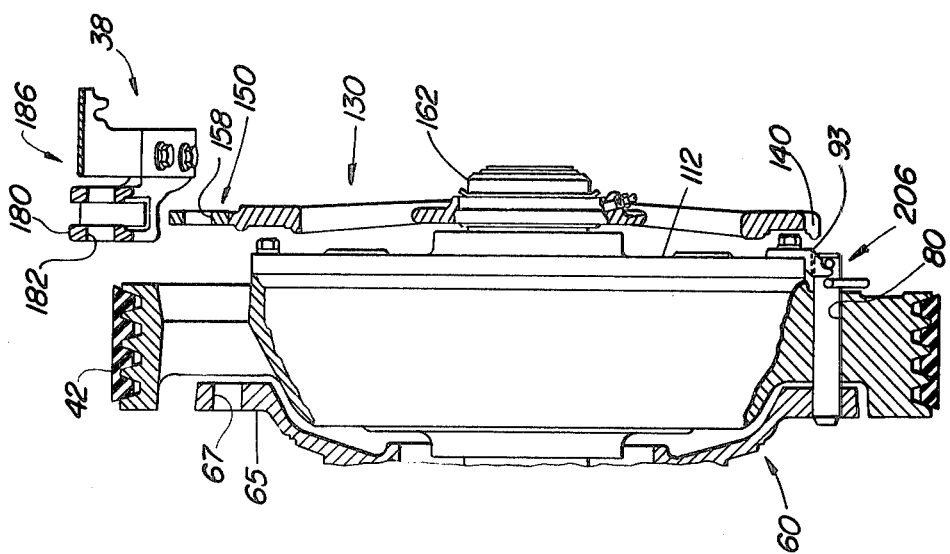
FIG. 5 is a view similar to FIG. 4 showing the connecting pin coupling the sheave body to the threshing cylinder shaft through the beater drive sheave for the direct drive mode.

For the reduced output speed mode, illustrated in FIGS. 1, 2 and 4, the shear lug 150 carried by the torque wheel 132 and the clevis end 180 of the control link 170 are brought together with the shear lug entering the clevis slot and the control pin bores 158 and 182 of the shear lug and clevis respectively in alignment. To couple these elements, the single control pin assembly 206 is again used and is inserted so that it may be retained by the insertion of the hair pin cotter 212 at the inner notch 196 of the pin retainer clip 192 and into the control pin 208.

In both the direct drive and reduced output speed modes, the timing together of the two holes in the control pin 208 makes it easier to insert the hair pin cotter 212 in that the (visible) alignment of the spring pin 210—determined by the shoulder 214 of the pin retainer 93 in the direct drive mode (FIG. 3), and the outer notch 198 of the socket portion 194 of the pin retainer clip 192 of the reduced output speed mode (FIG. 4)—serves as a guide to the position of the hole into which the hair pin cotter must be inserted.

In the reduced output speed mode, the control link assembly 38 secures the torque wheel assembly 130 stationary relative to the combine body 12 so that the second sun gear 98 is also held stationary and power is transmitted from the V-belt grooves 76 through the speed-reducing epicyclic gear train—second or input sun gear 98, second pinion 124, first pinion 122 to first or output sun gear 94 and the cylinder shaft 36.

The torque wheel assembly 130 forms an efficient control or power transmission element in that at the input point (control connection point, shear lug 150, radially adjacent the pulley drive surface, grooves 76) tangential forces are relatively low because of the radial distance from the axis of the shaft 36, permitting relatively light components to be used.

In the reduced output speed mode, the torque which may be applied to the driven functional elements (cylinder shaft 36 and threshing cylinder 11) for a given power input is of course increased (compared with the direct drive mode) and it may be within the capacity of the driving elements such as V-belts 22 and 42 to overload the cylinder shaft and/or threshing cylinder. The shearable connection or coupling (shear bolt with nut 152 connecting shear lug 150 to shear bolt boss 142 of the torque wheel 132) is of course designed to fail or shear at a torque level such that the shaft and cylinder (or other components) are not damaged. Upon shearing, the torque wheel 132 is free to rotate but the control link assembly 38 is immediately retracted by the spring 200 and held against the stop 216 so that the torque wheel 132 may rotate without interference. The shear lug 150 is still connected to the control link 170 and engagement of their respective mating surfaces (160, 184) maintains alignment so as to keep the shear lug 150 clear of the rim 138. Note, too, that the circular form of the rim 138 and the use of the concentric shear surface 144 at a radius slightly greater than the rim, along with the smooth junction between the two, presents a virtually snag-free contour in any inadvertent contact between control link 170 and wheel 132.

Shearing of a shear bolt 152 may result, for example, from an overload condition caused by uneven or excessive feeding of the threshing cylinder 11. Correction of the overload condition and installation of another shear bolt with nut 152 permits operation to continue. For convenience, a supply of shear bolts is stored in a rack 218 (see FIG. 2) attached to the combine frame conveniently close to their point of use.

The connections or control operations required to establish either the direct drive or reduced output speed modes are simple and easy to understand. However, the control components involved are designed to include features which facilitate changing from one mode to another in the field and prevent inadvertent miscoupling of components. For example, the thoughtless tying of the control link assembly 38 to the driven sheave is prevented by the control link clevis end 180 engaging the rim 138 of the torque wheel 132 and preventing the alignment of the control link bore 182 with the bore 80 of the sheave boss 78 (see FIGS. 4 and 5). Also, because the control pin bore 80 in the sheave is at a smaller swing radius than that of the control pin hole 158 in the shear lug 150, it is not possible, when coupling the control link assembly 38 to the shear lug 150, inadvertently to insert the control pin 208 so far through the control link as to engage a control pin bore 80 in the driven sheave thus preventing rotation of the sheave.

The compactness of a threshing cylinder (or other machine component) power transmission assembly according to the invention, can be appreciated from FIG. 3. The external functional portions of the assembly (beater drive sheave 60 and V-belt grooves 76) are spaced closely alongside the outside of the separator body wall 13. The gear-train portion of the transmission and the direct drive coupling flange 65 are contained, axially, substantially within the axial extent of the rim 74 (with its V-belt grooves 76) and the torque wheel assembly 130 increases only slightly the outward extension from the combine body wall 13 of the complete transmission assembly. The convenience and simplicity of changing between the direct drive and reduced speed modes is readily apparent from the drawings. The same single shiftable element (control pin assembly 206) is used in both modes so that the common problems of storage and/or misplacement of loose parts do not arise. The control pin 208 is an easy fit in the bores of sheave, beater sheave flange, torque wheel lug and control link and no tools are required to change from one drive mode to the other. Having a choice of three spaced direct drive connecting bores 80 in the pulley makes completing the direct drive setting more convenient. And wear of the meshing but non-rotating gears in this mode is avoided through by-passing the gears.

Assembly, disassembly and servicing of the transmission assembly 34 is simple and convenient. For example, with cap screws 92, cap 166 and nut 164 removed, the complete gear subassembly 90 may be pulled from the cylinder shaft 36 providing unobstructed access to the outward facing gear housing cavity 85 and to the gear train components without removing the relatively heavy inboard sheave portion 66 from the cylinder shaft 36. However, the complete transmission assembly 34 (less retaining nut 164 and cap 166) may be mounted on or disassembled from the cylinder shaft as a unit, as may be convenient in manufacturing assembly or in certain service operations.

I claim:

1. A drive mechanism for a rotatable element of a harvesting machine carried on a shaft journaled in the structure of the harvesting machine comprising:
   a driven assembly, including a body having an external circumferential drive surface, journaled on the shaft and including an internal gear train for drivably connecting the body to the shaft and including an input gear journaled on the shaft, the driven assembly being selectively operable to provide at least two driven speeds of the shaft; and means for controlling the driven assembly including a single connecting element usable selectively for connecting the body directly to the shaft independently of the gear train for a first driven speed and connecting the input gear non-rotatably to the harvester structure for a second driven speed.

2. The drive mechanism of claim 1 wherein the means for controlling the driven assembly includes a circular member concentrically and non-rotatably carried by the shaft and extending generally radially alongside the body of the driven assembly and wherein both the circular member and the body include axially aligned and registerable bores and the connecting element comprises a pin for entering and holding in alignment said bores for non-rotatably connecting the circular member to the driven assembly body.

3. The drive mechanism of claim 2 wherein the circular member includes an annular V-groove concentric with the shaft for rotation with the circular member to provide a second drive surface, for transmission of power beyond the shaft.

4. The drive mechanism of claim 3 wherein the circular member further includes an annular flange concentric with the shaft and of greater diameter then the V-groove and wherein the V-groove is closely spaced axially from said body drive surface and wherein the flange of the circular member is disposed between the V-groove and the body and lies at least partially within the axial extent of the body drive surface.

5. The drive mechanism of claim 2 wherein the means for connecting the input gear to the harvester structure includes a generally circular torque member non-rotatably connected to the input gear and said torque member includes an outer rim dimensionally modified in a first location to provide for connection to the harvester structure and notched in a second location, approximately diametrically opposite the first, and the dimensions of the torque member are such that the connecting pin can be inserted into the drive body and flange for the first driven speed only when the notch is in general alignment with the hole in the body.

6. In a mobile harvester having a driven element carried on a rotatable shaft journaled in and extending through a portion of the harvester structure and a speed changing drive mechanism carried concentrically on the shaft extension and including a plurality of rotatable elements selectively operable to drive the driven element at least two speeds including a first speed which is established by holding a first rotatable element stationary with respect to the harvester structure, an external torque limiting device operable when the drive mechanism is operating at the first speed comprising:

a torque member connected to the first rotatable element for rotation with it and having a shear surface extending approximately circumferentially with respect to the shaft axis and a bore intersecting the surface and approximately radial to and remote from the shaft axis;

a control link assembly having a first end pivotally connected to a portion of the harvester structure for pivoting about a pivot axis approximately parallel to the shaft axis and, adjacent an opposite end, a through bore registerable in a radially external abutting relationship with the bore of the torque member;

bias means operable between the link assembly and the harvester structure for biasing the link assembly generally radially away from the torque member; and a shear bolt for entering the respective bores of the link assembly and the torque member so as to hold said bores in alignment and so that the first rotatable element is held against rotation by the connection of the link assembly to the structure of the harvester and so that if the driving torque applied to the drive mechanism exceeds a predetermined limit, the shear bolt fails in shear and the linkage assembly is biased away from the torque member, relieving the load in the drive system and permitting the first rotatable element and torque member to rotate.

7. The torque limiting device of claim 6 wherein the control link assembly includes a link portion providing the pivotal connection to the harvester structure and a shear bolt adapter portion including the shear bolt bore and wherein said portions are releasably couplable by a connecting pin.

8. The torque limiting device of claim 6 wherein, when the torque member is connected to the harvester structure by the control link assembly, the shear bolt is disposed at approximately top dead center with respect to the shaft axis.

9. The torque limiting device of claim 6 wherein the control link assembly includes an elongated handle extending remotely from the control link pivot axis beyond the shear bolt adapter portion for providing leverage for manually pivoting the control link assembly against the bias means and also for engaging a portion of the harvester structure for limiting the movement of the link assembly away from the torque member, responsive to the bias means.

10. The torque limiting device of claim 6 wherein the torque member is generally circular and includes an external rim concentric with the shaft axis and wherein the shear surface is substantially flush with the rim.

11. The torque limiting device of claim 10 wherein the shear surface is disposed slightly radially outwards of the rim.

12. The torque limiting device of claim 6 wherein the first rotatable element is a spur gear concentric with the shaft and includes a hub extending axially from the drive mechanism and wherein the torque member is carried concentrically by said hub.

13. A transmission for the drive system of a mobile harvester functional element, the element being connected to a driven shaft, and the harvester having a power source and a frame, comprising:

a pulley carried concentrically by the driven shaft and having a body including a gear train with a plurality of gears including an output gear directly and drivingly connected to the shaft and an input gear journaled concentrically with the shaft and intermediate gear means for transmitting power between the input and output gears;

control means operable selectively to couple the pulley body to the shaft independently of the gear train for a first drive mode and to tie the input gear to the frame of the harvester for a second drive mode; and drive means for connecting the pulley to the power source.

14. The transmission of claim 13 wherein the input and output gears are side-by-side and the intermediate gear means includes a compound planetary gear set carried by the pulley body and including coupled first and second planetary pinions for meshing respectively with the output and input gears so that when the pulley body is coupled to the shaft, power is transmitted directly from the pulley body to the driven shaft and when the input gear is tied to the frame, the rotational speed of the output gear and hence of the driven shaft is a function of the gear ratios within the gear train.

15. The transmission of claim 14 wherein the means for tying the input gear to the harvester frame includes automatic disconnect means for limiting the torque which can be transmitted by the transmission.

16. The transmission of claim 13 wherein the control means includes a torque member drivably connected to and non-rotatable with respect to the input gear and a coupling flange drivably connected to and non-rotatable with respect to the shaft and means for selectively coupling the torque member to the harvester frame and the pulley body to the coupling flange.

17. The transmission of claim 16 wherein the means for coupling the torque member to the frame of the harvester includes a connecting link connectable at one end to the torque member and at its opposite end, pivotally connectable to the frame and means for biasing the connecting link generally radially away from the torque member.

18. The transmission of claim 16 and further including automatic disconnect means included in the means for coupling the torque member to the frame for limiting the torque output of the transmission.

19. In a combine harvester having a body including spaced apart first and second sidewalls and a threshing cylinder extending between the walls, the cylinder being carried on an axial shaft extending through the first wall, a two-speed transmission for the cylinder supported adjacent and external to the first wall comprising:
   a first sun gear mounted on the shaft for directly driving the shaft;
   a second sun gear rotatably and coaxially carried by the shaft;
   a pulley rotatably and coaxially carried by the shaft and having a body and a peripheral circumferentially extending drive surface;
   a compound planetary gear set carried by the pulley body for rotation about an axis parallel to the shaft axis and including coupled first and second pinions drivingly engaging and cooperating with the first and second sun gears respectively to constitute an epicyclic gear train; and
   means for controlling the transmission to establish, selectively, at least two drive modes, including a direct drive mode in which the pulley body is connected to the shaft independently of the gear train so that the shaft is driven directly at the same rotational speed as the pulley, and a speed-changing mode in which the second sun gear is non-rotatably connected to the combine body so that as the pulley is rotated, the speed of rotation of the shaft is determined by the gear ratios of the epicyclic gear train.

20. The transmission of claim 19 wherein the body of the pulley constitutes a housing having spaced-apart, generally radially extending inboard and outboard walls, the inboard wall being towards the first wall of the combine body and wherein the epicyclic gear train is contained between the walls of the pulley housing and wherein the second sun gear includes a hub portion extending externally of the housing, said hub portion carrying a torque member external to the housing and wherein the means for controlling the transmission further includes a shiftable element for selectively connecting either the pulley body drivably and directly to the shaft or the torque member to the body of the combine.

21. The transmission of claim 20 wherein the means for controlling the transmission further includes a control link pivotally connected to the harvester body and the shiftable element includes a control pin for selectively coupling either the body of the pulley to the shaft or the torque member to the control link.

22. The transmission of claim 19 wherein the means for establishing the direct drive mode includes a beater drive pulley carried concentrically and in fixed relation to the shaft adjacent the pulley housing.

* * * * *

UNITED STATES PATENT AND TRADEMARK OFFICE
CERTIFICATE OF CORRECTION

PATENT NO. : 4,483,128

DATED : 20 November 1984

INVENTOR(S) : Robert W. Hawkins

It is certified that error appears in the above-identified patent and that said Letters Patent is hereby corrected as shown below:

Column 11, line 10, delete "14" and insert -- 13 --.

Signed and Sealed this

Eighteenth Day of June 1985

[SEAL]

Attest:

DONALD J. QUIGG

Attesting Officer     Acting Commissioner of Patents and Trademarks